United States Patent [19]

Sakurai

[11] Patent Number: 4,701,823
[45] Date of Patent: Oct. 20, 1987

[54] MAGNETIC DISC RECORDING AND REPRODUCING DEVICE WITH DAMPER AND LOCK FOR HEAD MOVING MOTOR

[75] Inventor: Hiroshi Sakurai, Tokyo, Japan
[73] Assignee: Tokico Ltd., Kanagawa, Japan
[21] Appl. No.: 788,427
[22] Filed: Oct. 17, 1985
[51] Int. Cl.⁴ .......................... G11B 5/55; G11B 21/08
[52] U.S. Cl. ....................................... 360/106; 360/75
[58] Field of Search ........................ 360/105, 106, 75; 74/89.2

[56] References Cited

U.S. PATENT DOCUMENTS 4,139,874  2/1979  Shiraishi .
4,164,766  8/1979  Kaseta et al. ...................... 360/106

Primary Examiner—Robert S. Tupper
Attorney, Agent, or Firm—Wenderoth, Lind & Ponack

[57] ABSTRACT

A magnetic disc recording and reproducing device having a rotatable magnetic disc, a magnetic head for reading/writing information on the magnetic disc, a magnetic head displacing mechanism for displacing the magnetic head in the direction of a radius of the magnetic disc, an electric motor for driving the magnetic head displacing mechanism, a damper connected to a shaft of the motor and having a housing which is rotatable with the shaft of the motor, and a lock mechanism for permitting the rotation of the housing of the damper only when the magnetic head displacing mechanism is actuated.

7 Claims, 4 Drawing Figures

MAGNETIC DISC RECORDING AND REPRODUCING DEVICE WITH DAMPER AND LOCK FOR HEAD MOVING MOTOR

BACKGROUND OF THE INVENTION

This invention relates to a magnetic head displacing means for a magnetic disc recording and reproducing device.

Conventionally, a magnetic disc recording and reproducing device generally includes a rotatable magnetic disc, a magnetic head for reading/writing information on the magnetic disc, a magnetic head displacing mechanism for displacing the magnetic head in the direction of a radius of the magnetic disc, and an electric motor for actuating the magnetic head displacing mechanism. The magnetic head displacing mechanism is actuated by the motor to displace the magnetic head across a plurality of tracks, which are arranged on the magnetic disc in concentric circles and are spaced each other in the order of micron meters, and to locate the magnetic head accurately on a desired track. Two types of magnetic head displacing mechanisms have been utilized, one of which is called a linear type wherein rotational movement of the output shaft of the motor is converted into a linear movement of the magnetic head, and the other of which is called a swing arm type wherein the rotational movement of the output shaft of the motor is converted into a pivotal movement of a swing arm on which the magnetic head is mounted to move along an arcuate path extending generally in the direction of a radius of the magnetic disc.

In either type of the magnetic head displacing mechanisms, it is required that the magnetic head displacing mechanism not displace casually in its inactuated condition because of an external force due to such conditions as transportation, vibrations, and the like. To this end, a brake or lock mechanism has been provided for preventing casual rotation of the motor in the inactuated condition of the motor. Further, it is required that the magnetic head displacing mechanism accurately stop on a desired track despite the inertia force acting on moving parts. To satisfy such requirements there has been proposed a damping mechanism on the magnetic disc device.

Further, in locating the magnetic head on a desired track it is required to displace the magnetic head accurately with respect to a reference position or a reference track.

SUMMARY OF THE INVENTION

An object of the invention is to provide a magnetic head displacing device satisfying aforesaid requirements and being compact in size, easy to assemble, simple in construction and easy in maintenance and operation.

According to the present invention there is provided a magnetic disc recording and reproducing device comprising a rotatable magnetic disc, a magnetic head for reading/writing information on the magnetic disc, a magnetic head displacing mechanism for displacing the magnetic head in the direction of a radius of the magnetic disc, an electric motor for driving the magnetic head displacing mechanism, a damper connected to a shaft of the motor and having a housing which is rotatable with the shaft of the motor, and a lock mechanism for permitting the rotation of the housing of the damper only when the magnetic head displacing mechanism is actuated.

According to a preferred embodiment of the invention, the magnetic disc device further comprises a referential position detecting device including an interrupter secured to the housing of the damper and a photo detecting device.

BRIEF DESCRIPTION OF THE DRAWINGS

Further objects and advantages of the invention will become apparent from the following description of a preferred embodiment of the invention exemplified in the accompanying drawings, in which.

DETAILED DESCRIPTION OF THE INVENTION

Figure 1:
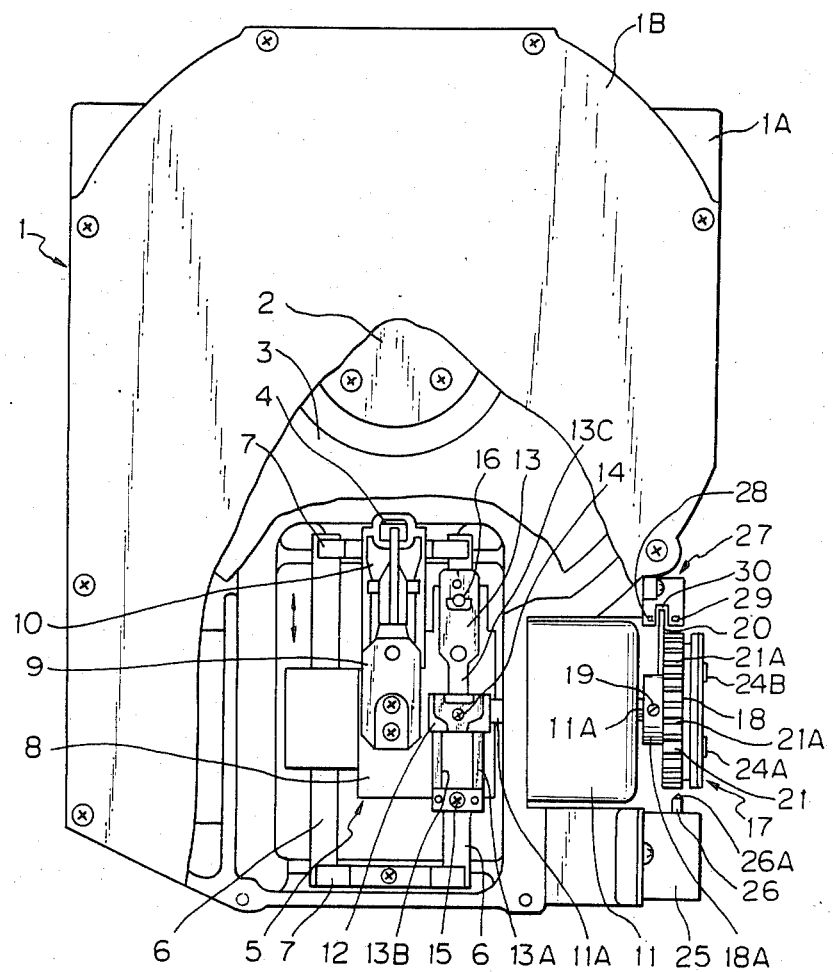
FIG. 1 is a partially broken away plan view of a magnetic disc recording and reproducing device according to the invention.

The magnetic disc recording and reproducing device shown in FIG. 1 comprises a casing 1 consisting of a main body 1A and a cover 1B defining a closed internal space therein, and a spindle motor (not shown) of such as an outer rotor type is mounted outside of the casing 1 and has a driving shaft 2 extending into the casing 1 to drive a plurality of overlappingly arranged magnetic discs 3 (only one is shown in the drawing). A plurality of (usually two times of the number of the discs 3) magnetic heads 4 are overlappingly provided for reading/writing the information on magnetic discs 3 and a linear type magnetic head displacing mechanism 5 (referred hereinafter as the displacing mechanism) displaces each magnetic head 4 in the direction of a radius of the disc 3 (vertically in FIG. 1). The displacing mechanism 5 includes two parallel guide rods 6, guide rod fixing members 7 for fixing opposite ends of each guide rod 6 to the casing main body 1A, a carriage 8 supported on guide rods 6 for displacing, vertically in the drawing (double ended arrow directions in FIG. 1), along the guide rods 6, and an arm 9 mounted on the carriage 8. A plurality of sets of leaf springs 10 are secured to the arm 9, and a magnetic head 4 is mounted on the tip ends of each set of the leaf springs 10.

A stepping motor 11 is mounted on the outside surface of the casing main body 1A with the output shaft 11A extending on opposite sides of the motor 11. A pulley 12 is fitted on the end of the shaft 11A extending into the casing 1. A steel belt 13 is provided between the pulley 12 and the carriage 8. The steel belt 13 includes a wide portion 13A having a slot portion 13B on one half of the length, and a reduced width portion 13C on the other half of the length. The width of the reduced width portion 13C corresponds to that of the slot portion 13B. The steel belt 13 is secured to the pulley 12 generally at the lengthwise central portion by a screw 14 and extends along the circumference of the pulley 12. The ends of the wide portion 13A and the reduced width portion 13C are secured respectively to the carriage 8 through a pin 16 and a screw 15 respectively. The displacing mechanism 5 including the stepping motor 11, the pulley 12, and the steel belt 13 is publicly known.

Figure 2:
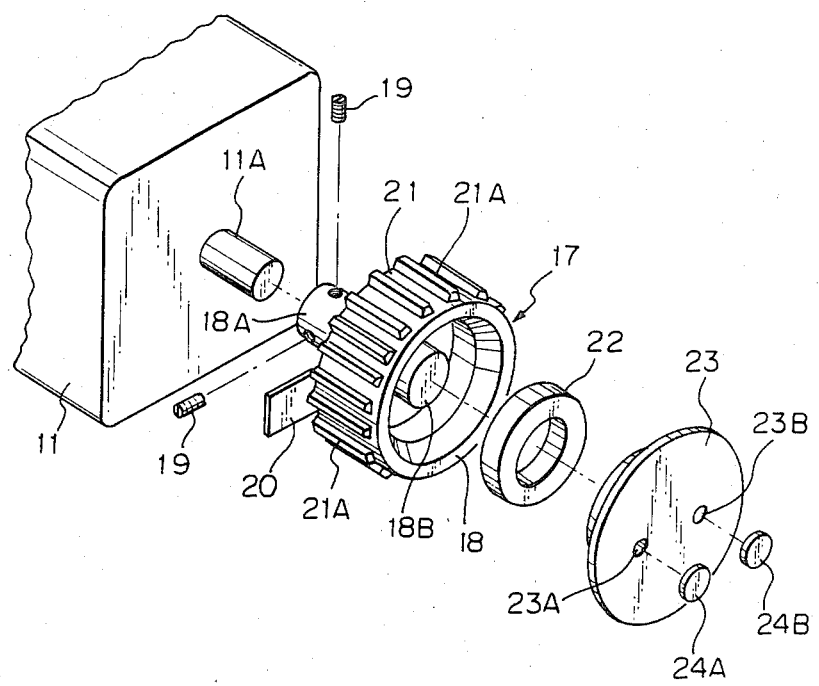
FIG. 2 is a perspective exploded view of a damper of the device of FIG. 1.

A damper 17 according to the invention is mounted on the shaft 11A of the stepping motor 11 on the outer side of the motor 11. As shown in FIG. 2, the damper 17 comprises a generally cylindrical housing main body 18 formed of an opaque synthetic resin material. The main body 18 has an integral an end wall closing one end thereof, an outwardly extending coaxial boss 18A to which the output shaft 11A of the stepping motor 11 is fitted and is secured thereto through screws 19, an inwardly projecting coaxial boss 18B, and a plurality of gear-teeth like projections 21A on the outer circumference thereof to define a plurality of engaging recesses 21 therebetween. The recesses 21 act to cooperate with a lock actuator 25 to constitute a lock mechanism according to the invention which will be described hereinafter.

The open end of the damper housing 18 is closed by a cap 23 formed of a transparent synthetic resin material, and a closed space is defined in the damper housing 18. An annular rotor 22 formed of a metal is rotatably mounted on the boss 18B in the damper housing 18. A viscous fluid such as silicone oil and the like is filled in the interior of the damper housing. For filling the fluid into the damper housing 18, there are provided two openings 23A and 23B in the cap 23 which are normally closed by plugs 24A and 24B respectively. In filling the fluid, one of the openings 23A and 23B acts as inlet and the other acts as outlet which enables a quick and reliable filling operation.

The lock actuator 25 is mounted on the casing main body 1A at a location adjacent to the damper 17. The lock actuator 25 comprises a solenoid (not shown) which is excited when the stepping motor 11 is actuated, and a plunger 26 having a tapered tip 26A and being normally biased by a spring (not shown) to project toward the outer circumference of the damper housing 18. The tip 26A of the plunger 26 normally engages with one of the engaging recesses 21 and prevents casual rotation of the damper housing 18, and the plunger 26 retracts when the solenoid is energized thereby permitting the rotation of the damper housing 18.

According to a preferred feature of the invention, an interrupter 20 having a small plate like configuration is integrally provided on the damper housing 18 to project from the outer circumference thereof as shown in FIG. 2, and a photoelectric sensor 27 acting as a reference position detecting device for detecting a reference position of the magnetic head 4 with respect to the magnetic disc 3 is provided adjacent to the outer circumference of the damper housing 18. The sensor 27 is mounted on the casing main body 1A at the location diametrically opposite to the lock actuator 25. The sensor 27 comprises a light emitting element 28 and a light receiving element 29 defining therebetween a gap 30 for passing therethrough the interrupter 20. A control device (not shown) is connected to the light receiving element 29 to detect that the light from the light emitting element 28 is interrupted by the interrupter 20 thereby detecting that the magnetic head 4 is located on the desired track in the magnetic disc 3.

The operation of the magnetic disc device according to the invention will now be explained.

For writing the information on either surface of one of the magnetic discs 3, or reading the information on the magnetic discs 3, the magnetic discs 3 are rotated by the spindle motor with opposite side surfaces of the magnetic discs 3 facing respectively the corresponding magnetic heads 4. The stepping motor 11 is rotated whereby the carriage 8 is displaced through the steel belt 13 which is secured to and wound around the pulley 12. Namely, the lengthwise central portion of the steel belt 13 is secured to the pulley 12 through screw 14, and the steel belt 13 extends around the circumference of the pulley 12 and is connected to the carriage 8 at the opposite ends thereof through the screw 15 and the pin 16. Thus in driving the carriage 8 downwardly in FIG. 1, a tension acts in the reduced width portion 13C of the steel belt 13 to transmit the driving force between the pulley 12 and the carriage 8, and in driving the carriage 8 in the upward direction, a tension acts in the wide portion 13A of the steel belt 13. The magnetic heads 4 mounted on the carriage 8 displace together with the carriage 8, and the reading or writing operation is performed between either surface of one of the magnetic discs 3 and the corresponding magnetic head 4 facing the one surface of the magnetic disc 3.

In the inactuated condition, the stepping motor 11 is deenergized, and thus, the solenoid of the lock actuator 25 is not excited, so that the plunger 26 of the lock mechanism projects and the tip 26A of the plunger 26 engages with one of recesses 21 in the outer circumference of the damper housing 18. The rotation of the stepping motor 11 is reliably prevented. Thus, casual rotation of the stepping motor 11 and the movement of the magnetic heads 4 due to vibrations and the like can reliably be prevented. In actuating the magnetic disc device, the electric source of the device is turned to ON, and which excites the solenoid of the lock actuator 25 to retract the plunger 26 from the recess 21. The locking condition is thereby released.

During the actuated condition, the stepping motor 11 steppingly or intermittently rotates the output shaft 11A thereof, and thus the moving parts including carriage 8, magnetic heads 4 and the damper housing 18 build up an inertia force which tends to continue the movement. The damping fluid received in the damper housing 18 and the rotor 22 freely rotatably mounted in the damper housing 18 counteract the inertia force, a viscous resistance force being generated in the viscous fluid to act between the damper housing 18 and the rotor 22 whereby the carriage 8 and magnetic heads 4 mounted thereon are displaced a predetermined precise amount with the inertia force being damped effectively by the damper 17.

The cap 23 of the damper housing 18 is formed of a transparent synthetic resin material and there are provided two openings 23A and 23B in the cap 23, so that the filling operation of the viscous fluid into the damper is easy and reliable, and any leakage of viscous fluid can be detected very easily. Further, the damper 17 is light in weight which can reduce the inertia force. Further, the lock mechanism is provided to cooperate with the damper 17 which makes it possible to simplify the construction and the minimize the size of the magnetic disc recording and reproducing device.

The operation of the reference position detecting mechanism will be explained hereinafter. When the interrupter 20 takes a position outside of the gap 30 in the photoelectric sensor 27 as shown in FIG. 3, the light emitted from the light emitting element 28 is received by the light receiving element 29 and, as the result, the control device detects that the magnetic heads 4 are not located on the desired tracks.

Figure 3:
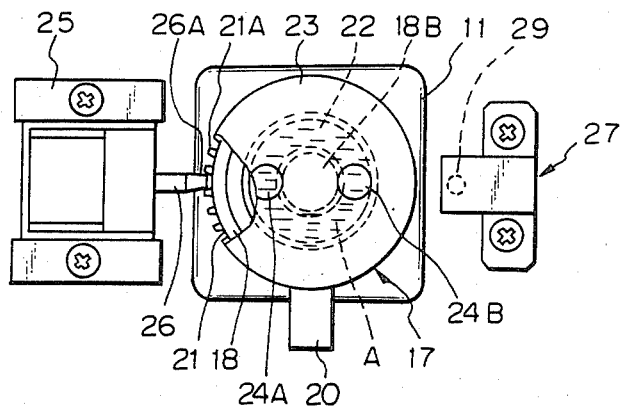
FIG. 3 is a side view showing the positional relationship between the damper, a referential position detecting device and a lock mechanism of the device of FIG. 1.
Figure 4:
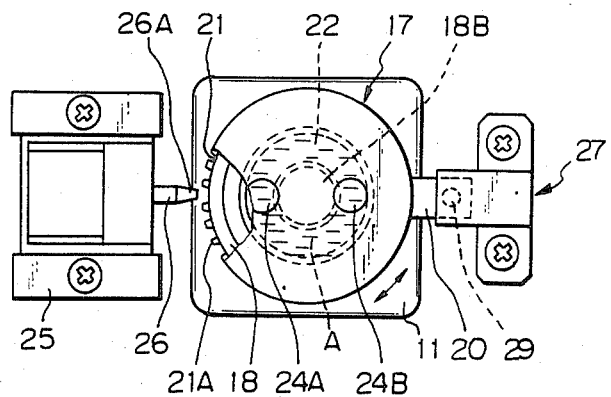
FIG. 4 is a view similar to FIG. 3 but showing the operational condition.

When the stepping motor 11 is rotated from the condition of FIG. 3 to the position shown in FIG. 4 wherein the interrupter 20 is rotated together with the damper housing 18 into the gap 30 in the photoelectric sensor 27, the light from the light emitting element 28 is intercepted by the interrupter 20. When the light from the light emitning element 28 is not received by the light receiving element 29, an electric signal is transmitted to the control device which indicates that magnetic heads 4 are located on the desired tracks.

As described heretofore, following advantages can be attained according to the present invention.

(a) The lock mechanism is actuated to permit the rotation of the damper housing by an actuator only when the magnetic head displacing mechanism is actuated. Thus, it is possible to reliably prevent casual movement of the magnetic head displacing mechanism which might be caused by such things as vibrations, external force and the like.

(b) The inertia force acting in moving parts of the magnetic head displacing mechanism can effectively be damped by the damper whereby the magnetic heads can be rapidly and precisely be located at desired positions.

(c) The lock mechanism, the damper and the reference position detecting device are mounted outside of the casing of the magnetic disc device. Thus, it is not requires to open the casing during the maintenance operation of the lock mechanism, the damper and the reference position detecting device, so that it is possible to prevent dust or dirt from entering into the casing.

(d) The recesses 21 for cooperating with the lock mechanism and the interrupter 20 for cooperating with the reference position detecting device are provided on the circumference of the damper housing 18, and the lock mechanism and the reference position detecting device are mounted at diametrically opposite positions with respect to the damper, so that the construction is simplified, and the size, particularly the overall height of the device, can be reduced.

What is claimed is:

1. A magnetic disc recording and reproducing device comprising:
    a rotatable magnetic disc;
    a magnetic head for reading/writing information on the magnetic disc;
    a magnetic head displacing mechanism on which said magnetic head is mounted and for displacing the magnetic head in the direction of a radius of the magnetic disc;
    an electric motor having a shaft connected to said mechanism for driving said displacing mechanism;
    a damper for damping the inertia force of said mechanism and the motor, said damper being connected to said shaft of said motor and having a housing which is rotatable with said shaft, and said housing having a plurality of notches on the outer circumferential surface thereof and spaced circumferentially therearound; and
    lock mechanism including a pawl member spring biased toward a lock position in which said pawl member is engaged in one of the notches to block the rotation of said housing, and a solenoid for acting on said pawl member to separate it from the notch against the spring biasing force when said electric motor is energized, whereby rotation of said housing is blocked when said motor is not actuated.

2. A magnetic disc device according to claim 1 wherein said housing of the damper is formed of a synthetic resin material.

3. A magnetic disc device according to claim 1 wherein a damping fluid is contained in the damper.

4. A magnetic disc device according to claim 1 further comprising a reference position detecting means for detecting a reference position of the magnetic head with respect to the magnetic disc.

5. A magnetic disc device according to claim 4 wherein said detecting means comprises an interrupter rotatably connected to the shaft of the motor, and photo detecting means.

6. A magnetic disc device according to claim 5 wherein said interrupter is mounted on the housing of the damper.

7. A magnetic disc device according to claim 6 wherein said photo detecting means and said lock mechanism are spaced by 180 degrees with respect to the circumference of the housing of the damper.

* * * * *